United States Patent [19]

Lewis, Jr. et al.

[11] Patent Number: 4,698,680
[45] Date of Patent: Oct. 6, 1987

[54] DIGITAL CORRELATION APPARATUS AS FOR A TELEVISION DEGHOSTING SYSTEM

[75] Inventors: Henry G. Lewis, Jr., Hamilton Square; Sheau-Bao Ng, Plainsboro, both of N.J.

[73] Assignee: RCA Corporation, Princeton, N.J.

[21] Appl. No.: 813,396

[22] Filed: Dec. 24, 1985

[51] Int. Cl.⁴ .................... H04N 5/14; H04N 5/21
[52] U.S. Cl. ............................ 358/166; 358/167; 358/905; 370/84; 364/724
[58] Field of Search ............. 358/160, 166, 167, 905, 358/187; 375/13, 15, 101; 333/18; 364/724, 728, 572; 370/84

[56] References Cited

U.S. PATENT DOCUMENTS

| | | | |
|---|---|---|---|
| 4,044,241 | 8/1977 | Hatley, Jr. ...................... | 235/152 |
| 4,285,006 | 8/1981 | Kurahashi et al. ............... | 358/35 |
| 4,313,195 | 1/1982 | Lehmann ......................... | 370/84 |
| 4,393,397 | 7/1983 | Holmes ........................... | 358/36 |
| 4,404,600 | 9/1983 | Murakame ....................... | 358/905 |
| 4,413,282 | 11/1983 | Wargo ............................ | 358/167 |
| 4,458,362 | 7/1984 | Berkovitz et al. ................ | 381/103 |
| 4,488,255 | 12/1984 | Krisher et al. .................. | 364/900 |
| 4,495,591 | 1/1985 | Loomis, Jr. ..................... | 364/724 |
| 4,539,690 | 9/1985 | Speidel ........................... | 333/18 |
| 4,571,720 | 2/1986 | Chevreau et al. ................ | 370/32 |
| 4,584,583 | 4/1986 | Dennis, Jr. et al. .............. | 343/380 |

OTHER PUBLICATIONS

Thedick, H., Adaptive Multipath Equalization for T.V. Broadcasting IEEE Trans. on Cons. Elect. 5/77, pp. 175-181.
Orfanidis, S. I., Optimum Signal Processing, an Introduction, pp. 280-289.

Primary Examiner—Howard W. Britton
Assistant Examiner—John K. Peng
Attorney, Agent, or Firm—E. M. Whitacre; P. J. Rasmussen; K. N. Nigon

[57] ABSTRACT

A television deghosting system includes an IIR filter having programmable filter coefficients which processes the input signals to remove ghost signal components. The IIR filter may be reconfigured as an FIR filter, having its coefficient and delay values changed to operate as a matched correlation filter. In this mode the filter is used to correlate a training signal to determine the relative delays of ghost signals with respect to the direct signal. The training signal used is the sum of the squared differentials of the in-phase and quadrature-phase components of the video IF signal during an interval defined by the leading edge of the vertical sync pulse and the first equalization pulse.

8 Claims, 14 Drawing Figures

100
DIGITAL CORRELATION APPARATUS AS FOR A TELEVISION DEGHOSTING SYSTEM

This invention relates to signal correlation circuits for use in a television ghost cancellation system.

Television reception has long been plagued by multipath distortion, the reception of undesired multiple signals. These undesired signals, reflected from buildings and other large objects or resulting from poorly terminated cable networks, appear as delayed versions of the direct television signal, and are commonly referred to as ghost signals in the reproduced image.

As set forth in the paper entitled "Adaptive Multipath Equalization For T.V. Broadcasting", IEEE Transactions on Consumer Electronics, May 1977, pp. 175–181, by H. Thedick, and hereby incorporated by reference, the transmission path which produces a ghost signal may be modeled as a feed-forward system in which the direct signal is reduced in amplitude by an attenuation factor, H, and delayed by an interval of time, T, to form a ghost signal. The transfer function, TG, of a transmission path which produces a single ghost may be represented in Z transform notation as:

$$TG = 1 + HZ^{-K}. \quad (1)$$

The equation 1 assumes a sampled data system in which $Z^{-K}$ represents a delay of K sample periods and approximates the time interval T. A simple algebraic manipulation of the equation (1) yields:

$$TG = (Z^K + H)/Z^K. \quad (2)$$

To correct for the distortion introduced by the transmission channel, it is desirable for the ghost cancellation system to have a transfer function, TC, which may be represented in Z transform notation as:

$$TC = Z^K/(Z^K + H) \quad (3)$$

or $$TC = 1/(1 + HZ^{-K}). \quad (4)$$

It is noted that the transfer function represented by the equation 4 describes a feedback system commonly referred to as an infinite impulse response (IIR) filter.

The ghost signals are delayed from the direct signal as a function of the relationship of the signal path lengths between the direct and the ghost signals. The randomness of this relationship from one receiver location to another dictates that the phase of the ghost carrier signal may have any relationship to the phase of the direct signal. In order to fully remove the ghost signal from the direct signal, it is necessary to consider both the delay of the ghost signal and its carrier phase relative to that of the direct television signal.

FIG. 1 illustrates the importance of the relative phases of the direct and ghost signals. When, for example, the direct signal is a 2T pulse, represented by waveform 10, the ghost signal may be represented by the waveforms 10, 12, 14 or 16 if the relative phase angle between the direct carrier signal and the ghost carrier signal is 0°, 90°, 180° or −90° (270°) respectively. Furthermore, since the relationship of the direct and ghost signal paths is random, any intermediate waveform is also a possibility.

The relative amplitude and phase information of the direct and ghost signals can be determined by demodulating the television signal into in-phase (I) and quadrature (Q) components. The I component being in-phase with the picture carrier of the television signal and the Q component being in-phase with a signal that is phase shifted by 90° relative to the picture carrier. These components describe the television signal in the complex plane where the I and Q components correspond to coordinates along the real and imaginary axes respectively. The convention of referring to the in-phase and quadrature components of the video signals as real and imaginary components respectively is used throughout this application. As set forth below, these I and Q components may be used with a complex IIR filter (i.e. one which has real and imaginary filter coefficients) to effectively cancel the ghost signal components of a television signal.

The randomness in the phase relationship between the direct and ghost signals may complicate detection of ghost signals and the determination of the time interval T by which a ghost signal is delayed relative to the direct signal. Traditionally ghost signal detectors have used correlation techniques wherein an otherwise undisturbed interval of video signal following a training signal is examined to locate disturbances which resemble the training signal. As shown in FIG. 1, however, the waveform of the in-phase component of the ghost signal does not always resemble the corresponding waveform of the direct signal.

Although the embodiment described below is in the context of a deghosting system for use in a television receiver, it is contemplated that this invention may be used in other systems where it is desirable both to correlate and to filter the signals being processed.

SUMMARY OF THE INVENTION

The present invention is a sampled data filtering and correlation system. The system includes apparatus for combining input signals applied to the system with correction signals to develop output signals of the filter system. These output signals are applied to a finite impulse response (FIR) filter, the filter coefficients of which may be switched between values for filtering and values for correlation via a control signal. In the filtering mode, the signals developed by the filter are applied to the signal combining apparatus as correction signals. In the correlation mode however, the output signals of the FIR filter are the output signals of the correlator and are not applied to the signal combining apparatus.

The following theoretical analysis of the methods used by the present system to remove ghosts is presented as an aid in understanding the operation of the systems shown in FIGS. 2-7.

Figure 1:
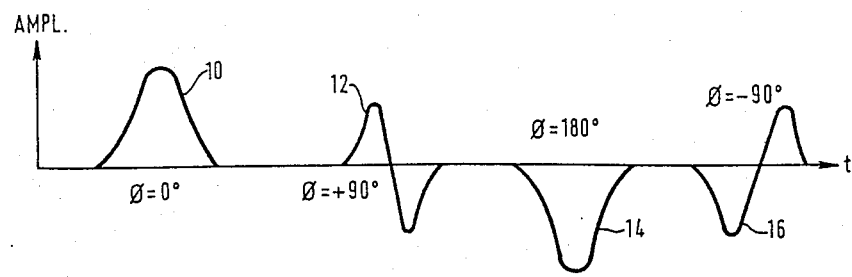
FIG. 1 (referred to above) is a waveform diagram of arbitrary ghost signals relative to a direct signal useful in describing the present invention.

Under the NTSC standard, television signals are transmitted in vestigal sideband form. The relatively low frequency components of the baseband signal (from 0–1.25 MHz) are double sideband modulated (DSM) while the higher frequency components (from 1.25 to 4.75 MHz) are single sideband modulated (SSM). The quadrature components of the two sidebands of the DSM portion of the signal are mutually cancelling, so the quadrature component of the DSM video signals is substantially zero. The quadrature components of the SSM portion of the signal, however, are non-zero and may interfere, as a ghost signal, with the in-phase portion of the modulated video signal as explained above in reference to FIG. 1.

Analytically, the in-phase and quadrature components of the modulated video signal, $S(t)$, may be represented by a complex baseband equivalent defined by the equation:

$$S(t) = S_I(t) + j s_Q(t) \tag{5}$$

where j is the complex quantity corresponding to the square root of $-1$ and $S_I(t)$ and $S_Q(t)$ are the baseband signals which would be obtained if the signal $S(t)$ were synchronously demodulated using signals that are respectively in-phase with and quadrature phase related to the picture carrier signal. The signal $S(t)$ is applied to a multipath transmission channel to produce a ghost distorted signal $R(t)$. As set forth above and in the Thedick reference, a single ghost signal may be substantially canceled from the signal $R(t)$ by a recursive filter having a transfer function, TC, which may be represented in Z transform notation by the equation 4:

$$TC = 1/(1 + HZ^{-K}). \tag{4}$$

For multiple ghosts, this equation may be expanded to:

$$TC = 1 / \left( 1 + \sum_{K=1}^{M} h_K Z^{-K} \right) \tag{6}$$

since $S(t)$ and $R(t)$ are complex signals, it is desirable to use a complex deghosting filter, which is to say a filter having complex coefficients. Accordingly, each of the coefficients $h_K$ satisfies the equation:

$$h_K = a_K + j b_K. \tag{7}$$

Assuming that the relative delays, $Z^{-1}$ through $Z^{-M}$, of each of the ghost signals are known, the filter coefficients $h_1$ through $h_M$ are developed using an adaptive algorithm similar to the Widrow-Hoff least mean square algorithm described at section 6.3 of a textbook entitled *Optimum Signal Processing: An Introduction*, by S. J. Orfanidis, which is hereby incorporated by reference.

Figure 3:
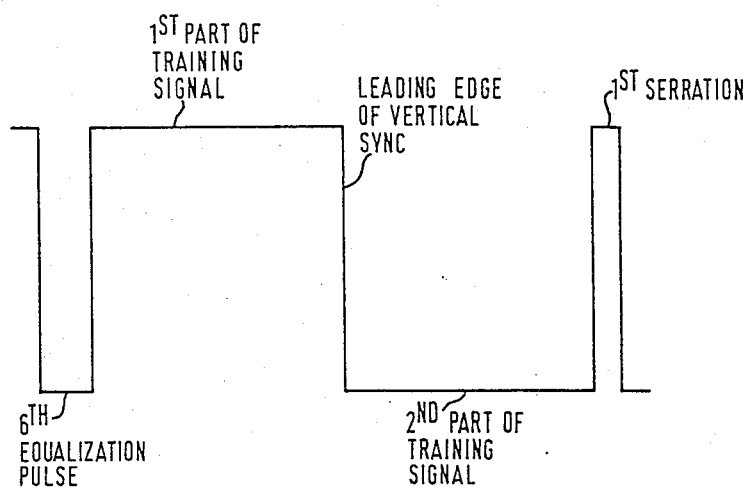
FIG. 3 is a graph of amplitude versus time showing a waveform that is useful in explaining the operation of the television receiver shown in FIG. 2.

In the embodiments described below, all of the coefficients are initially set to zero when the receiver is tuned to a channel for which the deghosting filter coefficients have not yet been calculated. During the first several field periods thereafter, each of the coefficient values is calculated by successively updating the existing coefficient values. The coefficient values are updated once per field in response to a training signal developed during the interval between the sixth equalization pulse and the first serration of the vertical sync pulse. The waveform of the television signal during this interval is shown in FIG. 3. The first part of the waveform has a duration of 0.46 times the horizontal line period (0.46 H) and a nominal amplitude of 0 IRE units. The second part of the waveform, after the leading edge of vertical sync, has a duration of 0.43 H and a nominal amplitude of $-40$ IRE units. It is assumed that, in the absence of noise, any deviation from $-40$ IRE units in the second part of the waveform is the result of a ghost signal that is a delayed, attenuated, and possibly phase shifted version of the leading edge of vertical sync.

During the second part of the training signal waveform, the in-phase and quadrature components of the signal $R(t)$, $r_I(t)$ and $r_Q(t)$ respectively, are applied to the filter for correction. The corrected signals provided by the filter ($\hat{s}_I(t)$ and $\hat{s}_Q(t)$) are then subtracted from respective $-40$ IRE and 0 reference values. The values of these difference signals at time delay intervals relative to the step transition corresponding to ghost signals provide a measure of the error in the values of the filter coefficients. These error signal values are used to update the coefficients according to an algorithm which may be represented by the following equation:

$$h_K(i+1) = h_K(i) + 2\mu(\hat{s}_I(n) - s_{REF}) \hat{s}^*_I(n-K). \tag{8}$$

In this equation, the terms $h_K(i+1)$ and $h_K(i)$ are complex values which represent the respective new and current values of the filter coefficients associated with a particular $Z^{-K}$ delay term. The factor $\mu$ is a scalar adaptation constant which may, for example, have a value of $2^{-14}$. This value represents a compromise between fast convergence to optimum coefficient values (large $\mu$) and small error in the values upon convergence (small $\mu$). The term $\hat{s}_I(n)$ is a complex value representing the current in-phase and quadrature sample values developed by the deghosting filter, i.e. the corrected sample values generated using $h_K(i)$, the current approximation of the filter coefficient $h_K$. The term $s_{REF}$ is a complex value representing the in-phase and quadrature values of the second part of the training signal in the absence of ghost signals. The factor $\hat{s}^*_I(n-k)$ is the complex conjugate (indicated by the superscript *) of the sample values $\hat{s}_I(n-K)$ which occurred K sample periods before the present sample period, n. For a ghost signal delayed by K sample periods relative to the leading edge of the vertical sync pulse, the in-phase and quadrature sample values of $\hat{s}_I(n-K)$ represent the values of the vertical sync waveform which correspond to the ghost signal components of the samples $\hat{s}_I(n)$.

The process of updating the coefficient values continues until the magnitude of the corresponding error values ($\hat{s}_I(n)$-$s_{REF}$) falls below a predetermined threshold. The value of this threshold is a function of the magnitude of the signal $R(t)$ and of its signal to noise ratio. If any of the error values does not converge to be less than the predetermined threshold, this may be an indication that the deghosting filter is unstable. Instability may occur, for example, when the level of the ghost signal is greater than the level of the direct signal. If a non-converging error value is detected, the filter coefficients $h_K$, corresponding to that error value are desirably set to zero.

The discussion up to this point has assumed that the time delays, $Z^{-K}$, of the ghost signals relative to the direct signal are known. The two deghosting systems described below contemplate two methods of determining the delay values. In the first system to be described, the deghosting filter is expanded to have a delay element and coefficient value corresponding to each sampling point in the second part of the training signal. For time delay values, $Z^{-K}$, that correspond to ghost signal delay values, the filter coefficient values are developed according to the algorithm set forth above. For time delay values $Z^{-K}$, that do not correspond to ghost signal delays, however, the difference between the corrected signal $\hat{s}_i$ and the reference value is zero so the filter coefficient $h_i$ associated with the delay $Z^{-K}$ should remain zero. The second deghosting system, which embodies the present invention, uses a relatively small number of filter stages (i.e. 5) and includes a correlator to determine the time delay values of the same number of ghost signals. The delay elements in the filter stages are set to match the delay times of the respective ghost signals. The correlator operates in a time interval preceding the coefficient update period and uses the same training signal as is used to update the coefficients. Since the correlation and coefficient update operations do not coincide, the same filter elements may be used for both. The structure and operational details of the correlator are explained below in reference to FIG. 7.

In the drawings, broad arrows represent busses for multiple-bit parallel digital signals and line arrows represent connections carrying analog signals or single bit digital signals. Depending on the processing speed of the devices, compensating delays may be required in certain of the signal paths. One skilled in the art of digital signal processing circuit design would know where such delays would be needed in a particular system.

Figure 2:
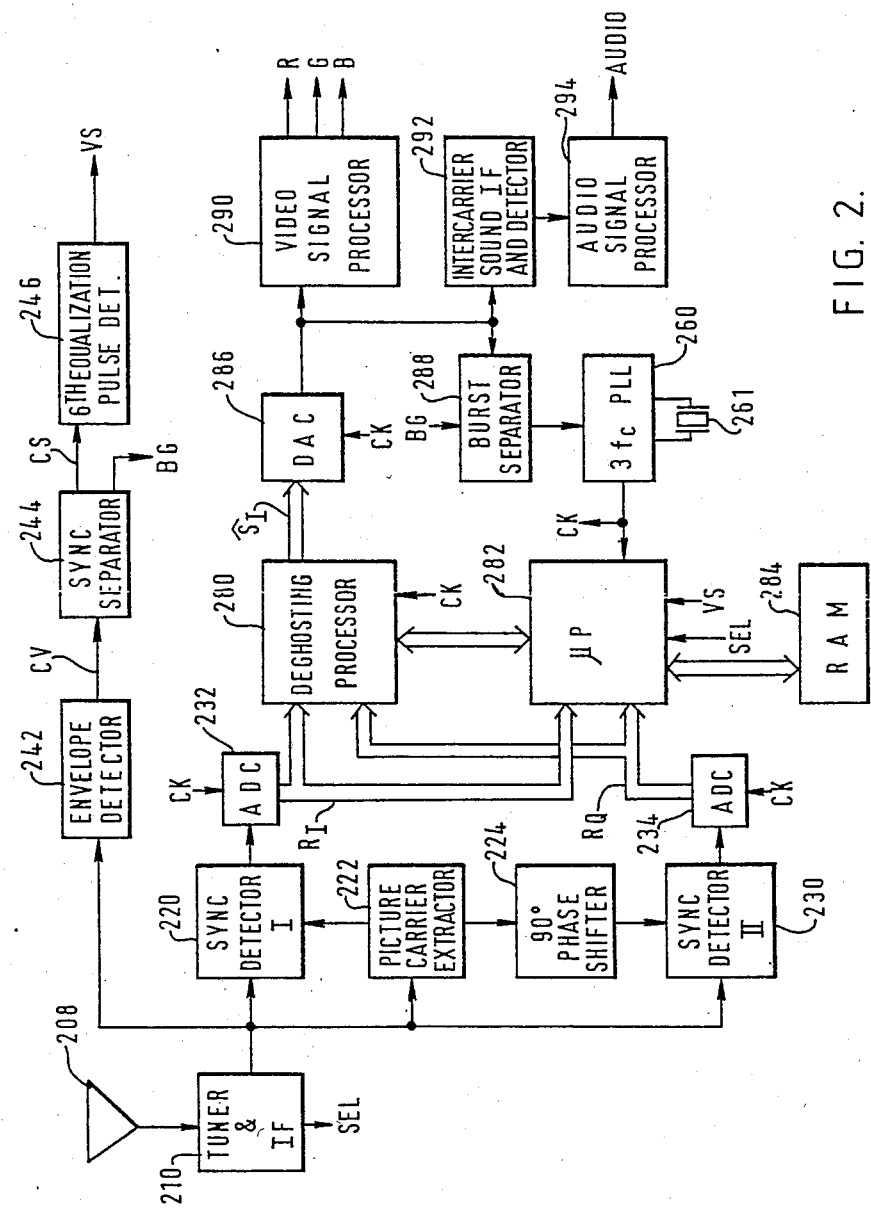
FIG. 2 is a block diagram of a television receiver incorporating the present invention.

Referring to FIG. 2, the signal processing section of a television receiver is shown. Radio frequency (RF) signals are received by an antenna 208 and applied to tuner and IF circuitry 210. The circuitry 210 may, for example, include a conventional television tuner and intermediate frequency (IF) filter and amplifier. In the present embodiment, the pass-band of the IF filter desirably encompasses the modulated sound intercarrier signals.

The IF signals developed by the circuitry 210 are applied to a conventional envelope detector 242 which develops a baseband composite video signal CV. Conventional sync separator circuitry 244 is responsive to the signal CV to remove the composite synchronization signal, CS, from the composite video signal. The sync separator circuitry 244 also produces a burst gate signal, BG, which may be used to extract the color synchronizing burst signal components from each horizontal line of video signal.

A detector 246, responsive to the composite synchronization signal, CS, detects the last (sixth) pre-equalization pulse preceding the vertical synchronization pulse interval. The circuitry 246 produces an output pulse signal, VS, which substantially coincides with the sixth pre-equalization pulse of each field of the composite video signal. As set forth above, this pulse may be used to locate a training signal which may be used to determine the relative delay of the ghost signals and to adjust the coefficients of the deghosting filter.

The signals developed by the tuner and IF circuitry 210 are applied to a first synchronous detector 220, to a picture carrier extractor circuit 222 and to a second synchronous detector 230. The picture carrier extractor circuit 222 produces a first reference signal aligned in phase and frequency with the picture carrier of the direct video IF signal. This first reference signal is applied to the first synchronous detector 220 and to 90° phase shifter circuitry 224. The phase shifter circuitry 224 develops a second reference signal, quadrature phase related to the first reference signal. This second reference signal is applied to the second synchronous detector 230. The synchronous detectors 220 and 230 demodulate the IF signals into respective in-phase and quadrature phase components. The in-phase signals are applied to an analog to digital converter (ADC) 232 which is responsive to a system clock signal CK for developing digital signals $R_I$. Similarly, the quadrature phase signals are applied to an ADC 234 which, responsive to the clock signal CK, develops digital signals $R_Q$. The clock signal CK, which may, for example, have a frequency substantially equal to three times the NTSC color subcarrier frequency, $3f_c$, is developed by the phase-locked loop (PLL) 260 described below.

The signals $R_I$ and $R_Q$ are applied to a deghosting processor 280 and to a microprocessor 282. As set forth below, the deghosting processor 280 includes a complex sampled data IIR filter. The processor 280, under control of the microprocessor 282, filters the ghost-contaminated signals $R_I$ and $R_Q$ to produce a signal $\hat{S}_I$ which approximates the in-phase component of the direct signal to the substantial exclusion of any ghost signals. The signal $\hat{S}_I$ is applied to a digital to analog converter (DAC) 286, which produces an analog baseband composite video signal, representing the digital signal $\hat{S}_I$.

The analog baseband composite video signal is applied to a conventional burst separator 288 which is responsive to the burst gate signal, BG, provided by the sync separator circuitry 244 for separating the color synchronizing burst components from each horizontal line of the composite video signal. The separated burst signals are applied to the conventional PLL 260 which includes a resonant crystal 261 having, for example, a resonant frequency of $3f_c$. The PLL 260 is controlled by the burst signals to provide the $3f_c$ clock signal CK.

Composite video signals from the DAC 286 are also applied to a conventional video signal processor 290 and to intercarrier sound IF amplifier and detector circuitry 292. The video signal processor 290 may include, for example, circuitry to separate the luminance and chrominance components from the composite video signal and to process these components to produce red, green and blue primary color signals (R, G, and B respectively) for application to a display device (not shown). The intercarrier sound circuitry 292 may include a resonant tuned circuit for separating the 4.5 MHz sound carrier from the composite video signal, a 4.5 MHz IF amplifier and an FM detector for developing an audio signal. The audio signal is applied to an audio signal processor 294 which produces an audio signal for application to a speaker (not shown).

Microprocessor 282 may be any one of a number of the currently available microprocessors which may include a direct memory access (DMA) instruction, standard arithmetic instructions and interrupt handling capabilities. The microprocessor 282 is coupled to a random access memory (RAM) 284 and is coupled to receive a signal SEL from tuner and IF circuitry 210 indicating the currently selected channel, the signal VS provided by the sixth equalization pulse detector 246, the clock signal CK, and various signals from the deghosting processor 280 as described below. Responsive to the pulse signal VS, the microprocessor 282 executes a DMA instruction to store 512 of the $R_I$ and $R_Q$ samples, occurring during the interval following the equalization pulse, in the RAM 284. The 512 samples constitute approximately three-fourths of one horizontal line period of the incoming signal and include samples representing the leading edge of the vertical sync pulse. In the subsequent field period, the microprocessor examines these stored samples to find the leading edge of the vertical sync pulse. This transition marks the start of the training interval for generating the coefficients used by the deghosting filter. The initialization sequence of storing the samples following the VS pulse and examining the sample values to determine the timing of the leading edge of the vertical sync pulse may be repeated over several field intervals to increase the accuracy of the measurement. A second product of the initialization sequence are reference values $I_{REF}$ and $Q_{REF}$ representing the amplitude of the tip of the vertical sync pulse. This value, measured immediately after the step transition may also be averaged over several fields. The nominal values of $I_{REF}$ and $Q_{REF}$ are $-40$ IRE units and 0 IRE units respectively. The values of $I_{REF}$ and $Q_{REF}$ and a coefficient update signal, CU, are applied to the deghosting processor 280 by the microprocessor 282.

Figure 4:
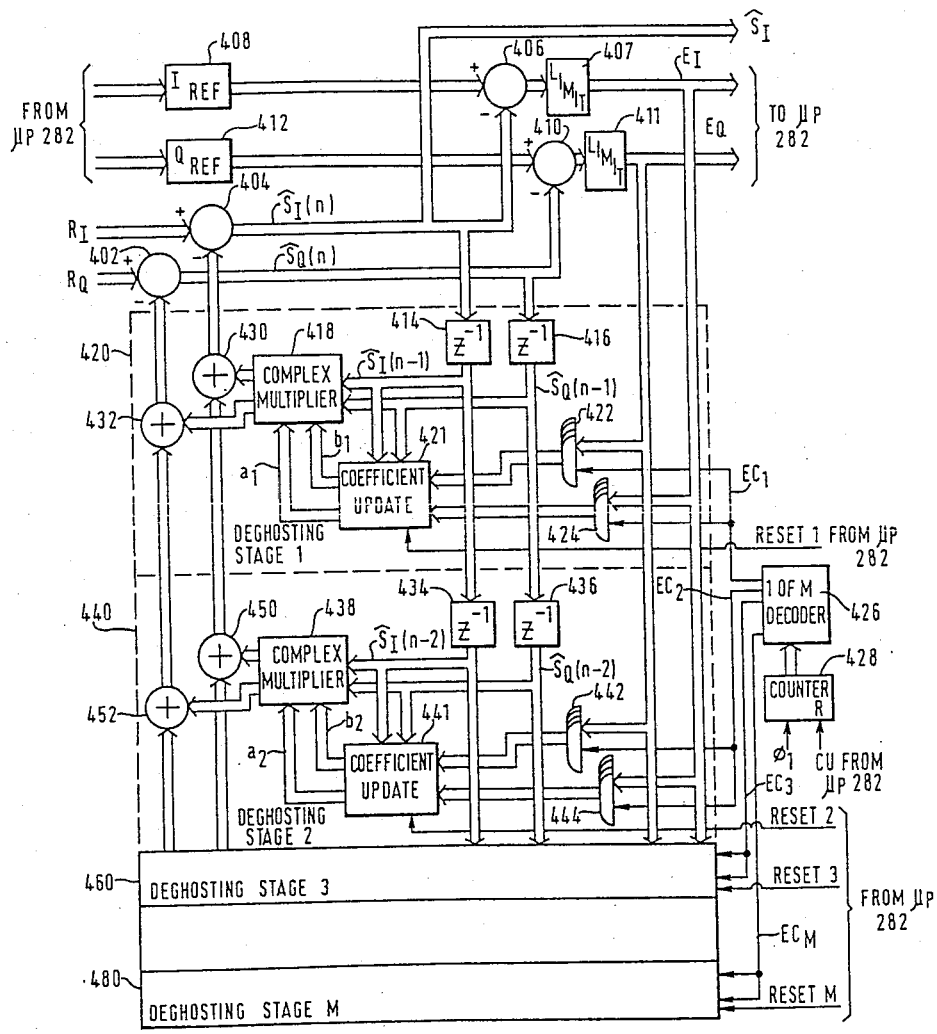
FIG. 4 is a block diagram of a recursive ghost correction filter suitable for use in the television receiver shown in FIG. 2.

FIG. 4 is a block diagram of a deghosting processor which includes one recursive filter stage for each of M (e.g. 256) successive sample periods that define the interval over which ghost signals may be corrected. In the figure, only the first three stages (420 440 and 460) and the last stage (480) are illustrated. Each stage is a separate filter which corrects ghost signals that are delayed by a predetermined time relative to the direct signal. In general, the ith stage of the filter processes ghost signals that have relative delays of i periods of the clock signal CK. The processor shown in FIG. 4 has two operational modes, a coefficient update mode, in which optimum filter coefficient values are calculated using a training waveform, and a deghosting mode, in which video signals are processed using optimum coefficient values to remove multipath distortion. The M stages of the filter are identical, consequently, only one stage, 420, is described in detail.

The input signals $R_I$ and $R_Q$ from the ADC's 232 and 234 are applied to the respective subtracters 404 and 402. In the deghosting mode, the subtracters 404 and 402 subtract in-phase and quadrature correction signals developed by the M filter stages from the signals $R_I$ and $R_Q$ respectively to develop respective signals $\hat{S}_I$ and $\hat{S}_Q$. These signals approximate the in-phase and quadrature components of the undistorted signal S applied to the transmission channel. The signal $\hat{S}_I$ is the output signal of the deghosting processor.

In the coefficient update mode, however, the filter coefficients are not at their optimum values, so the signals $\hat{S}_I$ and $\hat{S}_Q$ provided by the subtracters 404 and 402 may include significant ghost signal components. Since the amplitude of the second part of the training signal should be constant and of known value, the amplitude of the ghost signal components can be determined as the difference between these known signal values and the signals $\hat{S}_I$ and $\hat{S}_Q$. The ghost signal components ($E_I$) of the signal $\hat{S}_I$ are measured by subtracting the values of $\hat{S}_I$ during the second part of the training signal from the reference value, $I_{REF}$, in subtracter 406, and then limiting the difference samples to have magnitudes less than 40 IRE in the limiting circuitry 407. Similarly, the subtracter 410 subtracts the $\hat{S}_Q$ samples from the reference value $Q_{REF}$ and limiting circuitry 411 limits the magnitudes of these difference values to be less than 40 IRE, to produce a signal $E_Q$ which represents the ghost signal components of the signal $\hat{S}_Q$. The signals $E_I$ and $E_Q$ may be referred to as error signals since they represent ghost signals which have not been removed by the deghosting filter. The signals $E_I$ and $E_Q$ are applied in parallel to each of the M stages of the deghosting filter to update the filter coefficients and to the microprocessor 282 which monitors the error signals, as set forth above, to ensure that the filter is stable. The values of $E_I$ and $E_Q$ for a single training signal may, for example, be transferred directly to the RAM 284 via a DMA instruction to the microprocessor 282.

Each of the signals $E_I$ and $E_Q$ includes one sample for each of M sample periods in the second part of a training signal. Each stage of the filter is responsive to a respectively different pair of these error samples while the filter coefficients are being updated. Each stage of the filter is enabled when its corresponding error signal values are available by a respectively different one of the enabling signals $EC_1$ through $EC_M$. As shown for the first stage, 420, the signal $EC_1$ is applied to a first input terminal of each of a number of AND gates 422 and 424. The second input terminals of the AND gates 422 are coupled to receive respectively different bits of the error signals $E_Q$ while the second input terminals of the AND gates 424 are coupled to receive respectively different bits of the error signals $E_I$. Thus, the error signal values $E_I$ and $E_Q$ are applied to the coefficient update circuitry 421 only when the signal $EC_1$ is a logic one.

The signals $EC_1$ through $EC_M$ are developed by a 1 of M decoder 426 in response to values provided by a counter 428. The counter 428 is enabled by a signal CU, provided by the microprocessor 282, to count pulses of the clock signal CK. The signal CU is a logic zero, enabling the counter, only during the second part of the training signal and only while coefficients are being updated. When CU is a logic 1, a counter value of 0 is applied to the decoder 426 and all of the output signals $EC_1$ through $EC_m$ have values of logic zero.

Following the leading edge of vertical sync, during the coefficient update period, the counter is enabled and its value is incremented by successive pulses of the clock signal CK from 1 to M. The counter values are applied to the decoder 426 causing the corresponding output signals of the decoder, $EC_1$ through $EC_M$ to switch from logic zero to logic one for one period of the clock signal CK. The timing of the signals $EC_1$ through $EC_M$ is controlled by the microprocessor 282 so that the error signal values, $E_I$ and $E_Q$, corresponding to the Kth sample period following the vertical transition are applied to the Kth filter stage when the corresponding enabling signal, $EC_K$, is a logic one.

In the first deghosting stage, 420, the error signals $E_I$ and $E_Q$ are applied to two input ports of coefficient update circuitry 421. The other two input ports of the circuitry 421 are coupled to receive the signals $\hat{S}_I$ and $\hat{S}_Q$ delayed one period of the clock signal CK by the delay elements 414 and 416 respectively. Each stage of the filter includes delay stages similar to 414 and 416 which are coupled to the corresponding delay elements of the previous stage so that the signals $\hat{S}_I$ and $\hat{S}_Q$ applied to each stage are delayed by successively greater numbers of clock periods. To avoid confusion in referring to the delayed or undelayed signals $\hat{S}_I$ and $\hat{S}_Q$, the samples of the signals $\hat{S}_I$ and $\hat{S}_Q$ available at the output ports of the subtracters 402 and 404 are referred to as $\hat{S}_I(n)$ and $\hat{S}_Q(n)$ while the samples provided by the delay elements of a given stage K are referred to as $\hat{s}_I(n-K)$ and $\hat{s}_Q(n-K)$. In the coefficient update mode, the sample values $\hat{s}_I(n-K)$ and $\hat{s}_Q(n-K)$ correspond to respective in-phase and quadrature sample values immediately following the step transition in the training waveform.

Desirably, the sample values $\hat{S}_I(n-K)$ and $\hat{S}_Q(n-K)$ used in the coefficient update algorithm have the same values for all of the filter stages. Accordingly, it is contemplated that constant values may be used in place of these signals or that a single pair of samples may be used for all of the filter stages.

Figure 5:
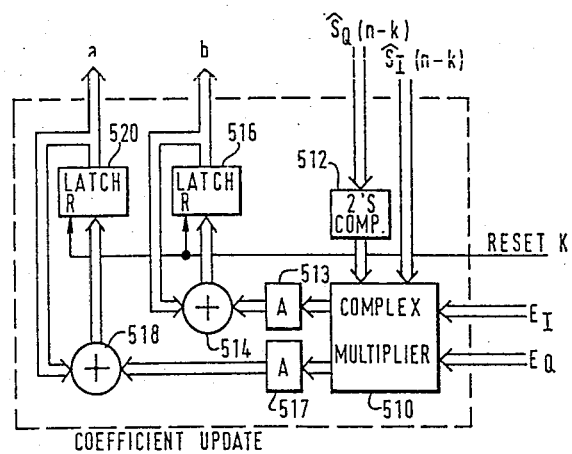
FIG. 5 is a block diagram of coefficient update circuitry suitable for use with the filter shown in FIG. 4.

FIG. 5 is a block diagram of coefficient update circuitry suitable for use with the deghosting processor shown in FIG. 4. The samples of the error signals $E_I$ and $E_Q$ are applied to one set of real and imaginary input ports of a complex multiplier 510. The sample value $\hat{s}_Q(n-K)$ is complemented by twos complementing circuitry 512. The sample $\hat{s}_I(n-K)$ and the complemented $\hat{s}_Q(n-K)$ form the complex conjugate of the complex value having real and imaginary terms $\hat{s}_I(n-K)$ and $\hat{s}_Q(n-K)$ respectively. This complex conjugate value is applied to the second set of input ports of the complex multiplier 510. The output signals of the multiplier 510 correspond to the complex product term $(\hat{s}_I(n)-S_{REF}) \cdot \hat{s}_i^*(n-K)$ of the equation 8. The complex multiplier 510 may be identical to the one shown in FIG. 6, described below.

The real and imaginary components of the product provided by the complex multiplier 510 are applied to respective sample scaling circuits 517 and 513. The circuits 517 and 513 multiply the respective real and imaginary values by an adaptation constant A. The constant A may be, for example, $2^{31 \cdot 13}$ and corresponds to the factor $2\mu$ of equation 8. It is contemplated that the sample scaling performed by the circuits 513 and 517 may, alternatively, be implemented by using bit-lines of the output signals of the multiplier 510 that are more significant by 13 bit positions than the bit-lines that would be used if the sample scaling were done by separate circuitry (i.e. by shifting the output signals of the multiplier to less significant bit positions). Alternatively, the scaling may be performed in the complex multiplier 510, described below, between the multipliers and the adder/subtracter to reduce the complexity of the adder and subtracter.

The scaled real and imaginary (I and Q) samples from the respective circuits 517 and 513 are applied to the adders 518 and 514 respectively. The output ports of the adders 518 and 514 are coupled to the respective latches 520 and 516 which contain the previous coefficient values ($h_k(i) = a_k(i) + jb_k(i)$) and which provide the second input values to the adders 518 and 514 respectively. The values provided to the latches by the adders are the coefficient values $a_k(i+1)$ and $b_k(i+1)$ which constitute the complex coefficient $h_k(i+1)$. The coefficient update circuitry shown in FIG. 5 implements the coefficient update algorithm represented by equation 8.

The latches 516 and 520 have reset input terminals which are interconnected and coupled to a signal, RESET K. Referring, once more, to FIG. 4, each stage of the deghosting filter includes a reset input terminal, RESET 1 through RESET M, coupled to the microprocessor 282. As a part of the update algorithm, the microprocessor resets all of the latches (setting all of the coefficients to zero) before entering the coefficient update mode. The reset input terminals may also be used by the microprocessor to set a coefficient to zero if it is determined that the coefficient may cause the filter to be unstable.

The coefficient values $a_1$ and $b_1$ provided by the coefficient update circuitry 421 are applied to one set of real and imaginary input ports of a complex multiplier 418. The delayed samples $\hat{s}_I(n-1)$ and $\hat{s}_Q(n-1)$ are applied respectively to a second set of real and imaginary input ports of the multiplier 418. The complex multiplier 418 may, for example, be identical to the one shown in FIG. 6, described below. The real (in-phase) and imaginary (quadrature) values provided by the complex multiplier 418 represent the correction signals for ghost signals that are delayed by one period of the clock signal CK relative to the direct signal. In both the update and deghosting modes, each of the M stages of the deghosting filter produces an in-phase and a quadrature-phase correction signal to compensate for ghost signals which are delayed relative to the main signal by an amount of time substantially equal to the delay associated with the stage. That is to say, each stage, K, produces signals which correct for ghost signals that are delayed by K sample periods relative to the direct signal. The signals produced by each of the stages are combined with the corresponding signals from stages having greater delay values in a pair of adder trees. The adders 430 and 432 are nodes in the adder tree for the first deghosting stage 420. The in-phase and quadrature correction signals developed by the complex multiplier 418 are applied to the first input ports of the respective adders 430 and 432. The other input ports of the adders 430 and 432 are coupled to output ports of the adders 450 and 452 respectively. Adder 450 provides the combined in-phase correction signals from the stages 2 through M and adder 452 provides the combined quadrature-phase correction signals from the stages 2 through M. The signals developed by the adders 430 and 432 are the respective combined in-phase and quadrature-phase correction signals from the filter stages 1 through M. The combined in-phase correction signals are subtracted from the signal $R_I$ by the subtracter 404 to produce the signal $\hat{S}_I$, and the combined quadrature correction signals are subtracted from the signal $R_Q$ by the subtracter 402 to produce the signal $\hat{S}_Q$. Depending on the number of stages, M, used in the deghosting filter, the amount of delay provided by each stage may need to be adjusted to ensure that the correction signals developed by the stages have sufficient time to propagate through the adder tree for timely application to the subtracters 402 and 404.

Figure 6:
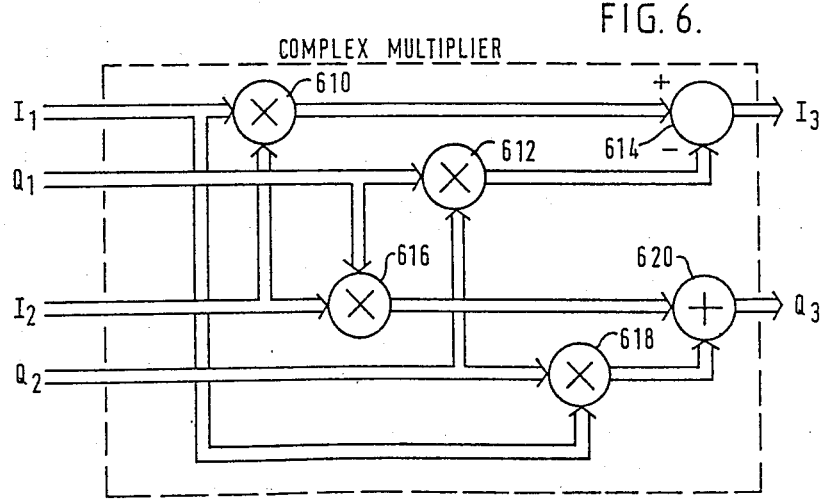
FIG. 6 is a block diagram of a complex multiplier suitable for use with the circuitry shown in FIGS. 4 and 5.

FIG. 6 is a block diagram of a complex multiplier suitable for use with the two deghosting processors described herein. In FIG. 6, first real (in-phase) and imaginary (quadrature) values, $I_1$ and $Q_1$, are applied to respective multipliers 610 and 612, and the second real and imaginary values, $I_2$ and $Q_2$, are applied to multipliers 616 and 618 respectively. The multiplier 610 forms the product of $I_1$ and $I_2$ and applies the result to the subtracter 614. The multiplier 612 forms the product of $Q_1$ and $Q_2$ and applies the result to subtracter 614. The subtracter 614 subtracts the product of $Q_1$ and $Q_2$ from the product of $I_1$ and $I_2$ to produce the real output value $I_3$. The multipliers 616 and 618 form the products of $I_2$ and $Q_1$ and of $I_1$ and $Q_2$ respectively and apply these products to an adder 620 which sums the products to produce the imaginary output value $Q_3$.

Figure 8A:
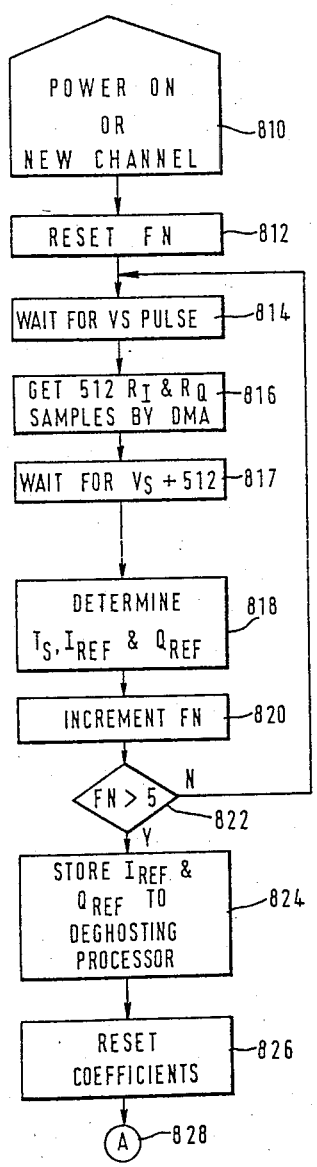
FIGS. 8A, 8B, 8C, 9A, 9B, 9C and 9D are flow charts useful in explaining the operation of the microprocessor shown in FIG. 2.
Figure 8B:
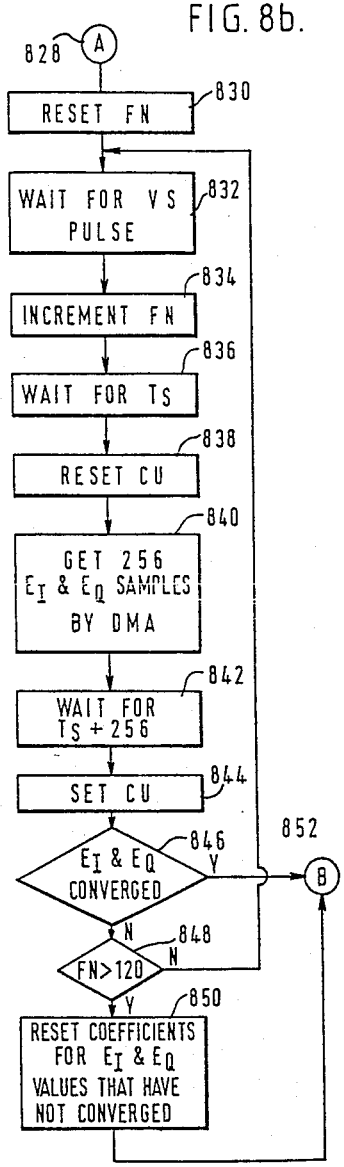
Figure 8C:
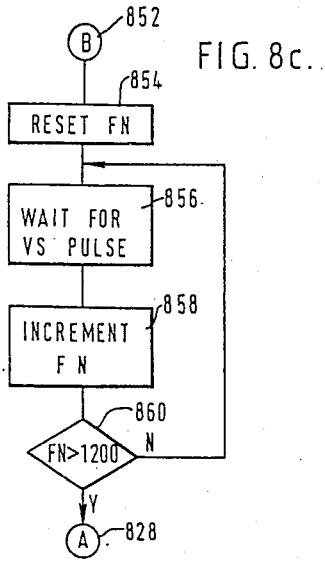

As set forth above, the deghosting processor shown in FIG. 4 is controlled by the microprocessor 282. FIGS. 8A, 8B and 8C are flow charts which describe the respective control-flows of the microprocessor in its three modes of operation: initialization, coefficient update and deghosting.

In FIG. 8A, the microprocessor enters its initialization mode when power is applied to the receiver or when a new channel is selected, 810. An internal variable FN (mnemonic for field number) is set to zero, 812, and the microprocessor 282 waits, 814, for the VS pulse signal from the sixth equalization pulse detector 246. When the VS pulse occurs, the microprocessor 282 executes a DMA command, 816, to transfer 512 samples of each of the signals $R_I$ and $R_Q$ into predetermined locations of RAM 284. During the field period following the pulse VS, the microprocessor examines the stored samples, 818, to find the largest step transition in the in-phase samples, $R_I$. This transition is assumed to be the leading edge of the vertical sync pulse. The sample period immediately following the step transition marks the start of the second part of the training signal. The number of this sample period relative to the first stored $R_I$ sample defines the timing of the vertical sync pulse relative to the pulse VS. This sample number is stored in an internal variable $T_S$. The values of the samples $R_I$ and $R_Q$ occurring immediately after the transition are the values $I_{REF}$ and $Q_{REF}$ used by the deghosting processor as set forth above. The values of $T_S$, and $I_{REF}$ and $Q_{REF}$ are averaged over five field intervals to compensate for noise as illustrated by the control steps 820 and 822 and the branch to step 814. When these values have been determined, the microprocessor stores the values of $I_{REF}$ and $Q_{REF}$ into the deghosting processor 824 and applies a pulse to the reset input terminal of each of the M filter stages, 826, to set their coefficient values to zero.

The step A, 828, in the control flow marks the end of the initialization mode and the start of coefficient update mode. In FIG. 8B, the first step 830 in the coefficient update mode is to reset the variable FN. The microprocessor then waits for the VS pulse, 832, and increments FN. After receiving the VS pulse, the microprocessor counts $T_s$ pulses of the clock signal CK, 836, and resets the signal CU applied to the counter 428 of FIG. 4. When CU is zero, the deghosting processor updates its coefficient values. Simultaneously, the microprocessor, via a DMA instruction, 840, stores $M=256$ samples of each of the error signals $E_I$ and $E_Q$. When these samples have been obtained, 842, at sample period $T_s+256$, the microprocessor sets the signal CU to logic one, 844, terminating the coefficient update operations for this field. The stored values of $E_I$ and $E_Q$ are then checked, 846, by the microprocessor against corresponding values which have been previously processed to determine if all of the error values have converged to be less than a predetermined threshold value. It is contemplated that the microprocessor monitors the error values for a predetermined amount of time (e.g. 1 second) before determining convergence. This delay is desirable to ensure that none of the error values is oscillatory. If all of the values have converged, the control flow branches to step B, 852, which marks the end of the coefficient update mode and the start of the deghosting mode. If all of the error values have not converged after two seconds (120 field periods) 848, the microprocessor resets the coefficients corresponding to the possibly oscillatory or divergent error values, 850, and then branches to step B.

FIG. 8C represents the control flow for the deghosting mode. In this mode, the microprocessor resets the variable FN, 854, and, each field period 856, increments it, 858, until 1200 field periods have occurred (20 seconds) 860. When this happens, the microprocessor branches to step A, the start of coefficient update mode to further refine the previously calculated coefficients.

Figure 7:
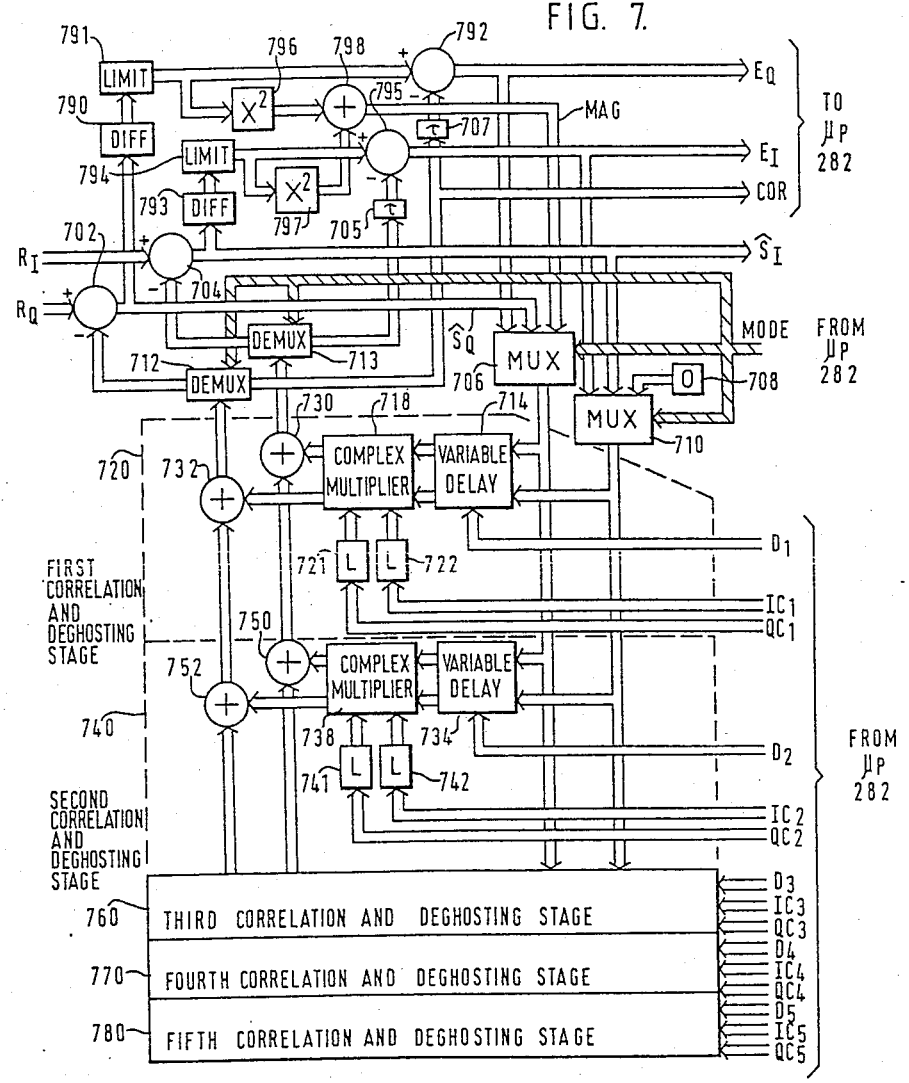
FIG. 7 is a block diagram of an alternative ghost correction filter suitable for use with the television receiver shown in FIG. 2.

FIG. 7 is a block diagram of a deghosting processor which may be used with an embodiment of the present invention. The processor shown in FIG. 7 includes only five stages (720, 740, 760, 770 and 780) each of which contains a variable delay element. The amount of delay provided by each of the delay elements is controlled by the microprocessor 282 to correspond to the time delay between the direct signal and a respectively different ghost signal. Thus, the processor shown in FIG. 7 can correct up to five ghost signals. To determine the timing of these five ghost signals, the deghosting processor shown in FIG. 7 may be configured as a correlation filter. To understand the operation of the deghosting processor in its correlation and deghosting modes, it is helpful to consider the processor as an IIR filter which includes an FIR filter in its feedback path. In the deghosting mode the processor is configured as an IIR filter with the delay and coefficient values appropriate for cancelling ghost signals. In the correlation mode, however, the feedback path is broken and the processor is configured as an FIR filter. The delay values used by the five stages of this filter are 1, 2, 3, 4 and 5 sample periods, respectively, and the coefficients are obtained from the five samples values which encompass the vertical sync transition of the direct signal, as described below. In the correlation mode, the processor is configured as a matched correlation filter.

The combination of the microprocessor 282 and the deghosting filter 280 shown in FIG. 7 operates in four distinct modes: initialization, ghost signal correlation, coefficient update and deghosting. The initialization mode differs from that described above in reference to FIGS. 4 and 8A as described below in reference to FIG. 9A. In this mode the microprocessor monitors the amplitude of the signal $R_I$ for 512 sample periods following the sixth equalization pulse to determine the timing of the leading edge of the vertical sync pulse relative to the sixth equalization pulse and to develop the correlation coefficients.

In FIG. 7, the signals $R_I$ and $R_Q$ provided by the respective ADC's 332 and 334 are applied to the subtracters 704 and 702 respectively. In the deghosting mode, the subtracters 704 and 702 subtract the combined in-phase and combined quadrature correction signals developed by the five stages of the correlation and deghosting filter, 720, 740, 760, 770 and 780 from the respective signals $R_I$ and $R_Q$. In this mode, the subtracters 704 and 702 provide the corrected signals $\hat{S}_I$ and $\hat{S}_Q$. The signal $\hat{S}_I$ is the output signal of the deghosting processor.

In the correlation and coefficient update modes, however, zero valued samples are subtracted from $R_I$ and $R_Q$ by the respective subtracters 704 and 702 and so, the signals $R_I$ and $R_Q$ are applied to the respective differentiating circuits 793 and 790. Each of these differentiating circuits subtracts the currently applied sample from the sample applied to the circuit immediately before the current sample. The difference samples provided by the differentiating circuits 790 and 793 are limited by the respective limiting circuits 791 and 794 to have values less than 40 IRE. This limiting step mitigates any adverse effects of noise spikes during the second part of the training signal. The signals developed by the limiting circuits 791 and 794 are applied to the respective subtracters 792 and 795 which, in the coefficient update mode, subtract correction signals developed by the five filter stages from the differentiated $R_Q$ and $R_I$ signals to develop the respective error signals $E_Q$ and $E_I$. The signals $E_Q$ and $E_I$ are applied to the microprocessor 282 which, in this embodiment of the invention performs the calculations for updating the coefficient values.

The differentiated and limited $R_I$ and $R_Q$ signals are applied to respective squaring circuits 797 and 796. These circuits multiply each sample value by itself and provide their output samples to respective input ports of an adder 798. The adder 798 sums the squared difference samples to develop a signal, MAG, corresponding to the magnitude of the vector sum of the $R_I$ and $R_Q$ signals. The signal MAG is used by the five filter stages during the correlation mode to determine the delays of up to five ghost signals relative to the direct signal.

The signals $E_Q$, $\hat{S}_Q$ and MAG are applied to respectively different signal input ports of a multiplexer 706 and the signals $E_I$, $\hat{S}_I$ and a zero-valued signal provided by a signal source 708 are applied to the corresponding input ports of a multiplexer 710. The multiplexers 706 and 710 are controlled by a signal, MODE, from the microprocessor 282 to provide the appropriate signals to the filter stages during the different operating modes. The signals $E_Q$ and $E_I$ are provided during the training period when the system is in its coefficient update mode; the signals $\hat{S}_I$ and $\hat{S}_Q$ are provided when the system is in its deghosting mode; and the signal MAG and the zero valued signal from source 708 are provided when the system is in its correlation mode. The signals output by the multiplexers 706 and 710 are applied in parallel to the five correlation and deghosting stages 720, 740, 760, 770 and 780. These five stages are structurally identical so only one, 720, is described in detail.

The signals provided by the multiplexers 706 and 710 are applied to variable delay element 714. Delay element 714 may, for example, include two programmable digital shift registers each having 293 eight-bit stages, one register for the signal provided by multiplexer 706 and one for the signal provided by multiplexer 710. The amount of time by which the shift registers delay these signals is controlled by a delay control signal $D_1$ provided by the microprocessor 282. The delayed signals from the multiplexers 710 and 706, respectively, are applied to first real and imaginary input ports of the complex multiplier 718. In-phase and quadrature coefficient values $IC_1$ and $QC_1$ from the respective latches 722 and 721 are applied to second real and imaginary input ports of the multiplier 718 respectively. The values $IC_1$ and $QC_1$ are applied to the respective latches 721 and 722 by the microprocessor 282.

The samples provided by the complex multiplier 718 have different meaning in the different operational modes of the deghosting system. In the correlation mode, the real or in-phase output samples are zero because the zero-valued signal from source 708 is applied to the first real input port of the multiplier 718 and a zero valued coefficient is applied to the second imaginary input port. The imaginary or quadrature-phase output samples represent the output of the first stage of the correlation filter. In the coefficient update and deghosting modes, the samples provided by the multiplier 718 represent signals which correct for ghost signals delayed, relative to the direct signal, by an amount of time represented by the delay value $D_1$. Each of the five stages 720, 740, 760, 770 and 780 provide similar signals at the output ports of their corresponding complex multipliers. The in-phase and quadrature-phase signals provided by each of the multipliers are summed in respective first and second adder trees and applied to the demultiplexers 713 and 712 respectively. The first adder tree includes the adders 730, 750 and corresponding adders in the filter stages 760 and 770. The second adder tree includes the adders 732, 752 and corresponding adders in the filter stages 760 and 770. These adder trees are similar to the ones described in reference to FIG. 4 and, so, do not need to be described herein.

The demultiplexers 712 and 713 are controlled by the mode signal from the microprocessor 282 to provide the output signals of the first and second adder trees to the respective delay elements 705 and 707, during the correlation and coefficient update modes, and to the respective subtracters 704 and 702 during the deghosting mode. The delay elements 705 and 707 compensate for the processing delay through the differentiators 793 and 790 and the limiters 794 and 791. The samples provided by the delay elements 705 and 707 are subtracted from the differentiated and limited $R_I$ and $R_Q$ signals by the respective subtracters 795 and 792 to develop the error signals $E_I$ and $E_Q$ respectively.

The output signal of the demultiplexer 712 is also the output signal of the correlation filter. This signal is used by the microprocessor 282 to determine the timing of any ghost signals relative to the direct signal.

As with the embodiment shown in FIG. 4, the deghosting processor shown in FIG. 7 is controlled by microprocessor 282. FIGS. 9A through 9D are flow charts showing the control flow of the microprocessor 282 in its four operational modes for this embodiment of the invention.

Figure 9C:
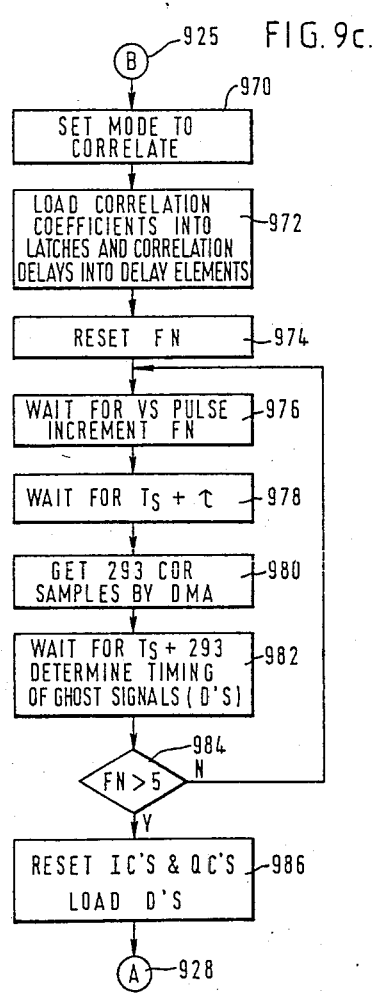
Figure 9D:
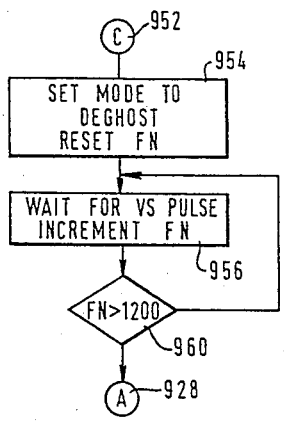
Figure 9A:
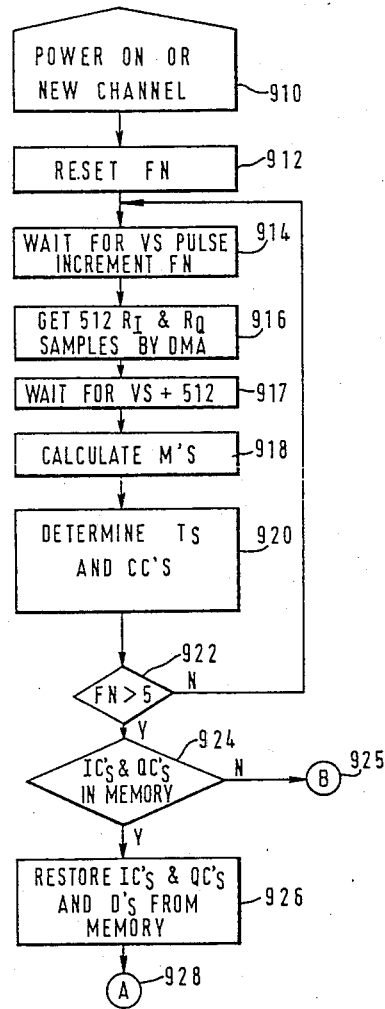

In FIG. 9A, the microprocessor enters its initialization mode when power is applied to the receiver or when a new channel is selected, 910. An internal variable, FN, is set to zero, 912, and the microprocessor waits, 914, for the next pulse of the signal VS from the sixth equalization pulse detector 246. When the pulse occurs the microprocessor increments the variable FN. On the occurrence of the VS pulse, the microprocessor executes a DMA command, 916, to transfer 512 samples of each of the signals $R_I$ and $R_Q$ into predetermined locations of the RAM 284. As set forth above, in reference to FIG. 8A, these samples include samples representing the leading edge of the vertical sync pulse. The microprocessor enters a waiting state, 917, until these sample values have been transferred.

During the field period following the pulse VS, the microprocessor calculates values m, for each pair of samples $R_I$ and $R_Q$, 918, according to the equation:

$$m = (R_I(n) - R_I(n-1))^2 + (R_Q(n) - R_Q(n-1))^2. \qquad (9)$$

These values correspond the instantaneous magnitudes of the combined differentials of the signals $R_I$ and $R_Q$. The samples, M, are substantially zero valued except where transitions occur in the input signals during the training interval. Thus, non-zero valued samples occur at the leading edge of vertical sync and at ghosts of the leading edge of vertical sync. If the values of M are plotted, the resulting waveform has a peak at the leading edge of vertical sync and smaller peaks at each of the "ghosts" of vertical sync in the sampled interval. The shapes of these peaks are substantially identical regardless of the relative phase of the direct and ghost signals. The microprocessor 282 examines the values m, 920, and sets the internal variable $T_s$ to the index of the sample value corresponding to the central sample of the largest peak (i.e. the number of samples between the pulse VS and the leading edge of the vertical sync pulse). The sample value having this index, the two samples immediately preceding it and the two samples immediately following it are normalized (by subtracting the average value of the five samples from each sample) and stored into the RAM 284 as the five correlator coefficients. The correlator coefficients CC1, CC2, CC3, CC4 and CC5 are stored and used in the order of the samples from which they are derived (e.g. CC3 corresponds to the largest peak value of the sample m). To compensate for noise in the signals $R_I$ and $R_Q$, the values of $T_s$ and CC1 through CC5 are averaged over five field intervals, 922.

It is noted that the signal MAG developed by the adder 798 is essentially the same as the values m developed by the microprocessor 282. It is contemplated that, for the step 816, samples of the signal MAG may be transferred to the RAM 284 in place of the samples of the signals $R_I$ and $R_Q$, and that the calculations represented by the equation 9 may then be eliminated from the step 918.

The next step 924 in the control flow of the microprocessor 282 determines whether filter coefficients (IC's and QC's) and delay values (D's) have already been calculated and stored for the currently selected channel. If these values have been stored, they are transferred to the corresponding latches in the deghosting processor in step 926. The microprocessor at step 928 then enters coefficient update mode, described below in reference to FIG. 9B If, however, the coefficient and delay values for the channel have not been stored, the microprocessor, at step 925, enters correlation mode. FIG. 9C is a flow chart showing the control flow of the microprocessor 282 in correlation mode. The first step, 970, sets the MODE signal to the correlation value. Then, 972, the correlation coefficients CC1 through CC5 are loaded into the I coefficient latches of the five filter stages via the respective busses $IC_1$ through $IC_5$ and delay values (D's) of 1 through 5 sample periods are loaded into the delay elements of the respective five filter stages 720, 740, 760, 770 and 780. The internal field count variable FN is reset, 974. The microprocessor 282 then waits, 976, for the next pulse of the signal VS and, when this occurs, increments FN. At step 978, the microprocessor waits for $T_s+\tau$ sampling periods following the pulse and then executes a DMA command to get 293 samples of the signal COR. The number of sample periods $\tau$ represents the processing delay through the circuitry which develops the signal COR from the signals $R_I$ and $R_Q$. The microprocessor waits, 982, until all of the samples have been transferred before determining the sample indicies (D's) at which each of the "ghosts" of the leading edge of vertical sync occur. The sample numbers for all of the ghosts are averaged over five field intervals, 984, to compensate for noise.

Referring to FIG. 7, the multiplexer 706, in the correlation mode, provides the signals MAG to one of the imaginary (quadrature) input ports of the complex multiplier 718 via the delay element 714. The multiplexer 710 applies the zero value from source 708 to the corresponding real (in-phase) input port. The microprocessor applies the correlation coefficient CC1 to the latch 722 via the bus $IC_1$ and applies a zero value to the latch 721 via the bus $QC_1$. The latches 721 and 722 provide the second imaginary and real input values, respectively, to the complex multiplier 718. Since one real input value and one imaginary input value are zero, the real output value of the complex multiplier 718 is zero. The imaginary output values of the multiplier 718 and of the corresponding multipliers of the stages 740, 760, 770 and 780 are summed in the adder tree which includes the adders 732 and 752. The summed values are applied to the demultiplexer 712 which under control of the mode signal from the microprocessor 282 routes the summed signal onto the bus COR. In this configuration, the deghosting processor acts as an output weighted FIR filter. As set forth above, the delay values used by the five stages of the filter are 1, 2, 3, 4 and 5 clock periods respectively and the weighting coefficients of this filter are generated by normalizing five successive values m, computed from the signals $R_I$ and $R_Q$ at the leading edge of the vertical sync according to the equation 9. The differentiators 790 and 793, limiters 791 and 794, squaring circuits 796 and 797 and the adder 798 perform calculations similar to equation 9 on the samples of the second part of the training signal waveform. Consequently, the deghosting processor is a matched correlation filter in the correlation mode. The waveform of output signal represented by the samples COR has peaks at the sample numbers corresponding to the "ghosts" of the leading edge of vertical sync. The microprocessor 282 determines the sample numbers of the five largest peaks and stores them as the values D1 through D5, where, for example, D1 is the smallest and D5 the largest sample number.

Referring to FIG. 9C, once the delay values, D1 through D5 have been determined, the microprocessor 282, at step 986, applies zero coefficient values to the five filter stages via the busses $IC_1$ through $IC_5$ and $QC_1$ through $QC_5$ and loads the values of D1 through D5 into the respective variable delay elements of the stages. At step 928, the microprocessor enters coefficient update mode.

Figure 9B:
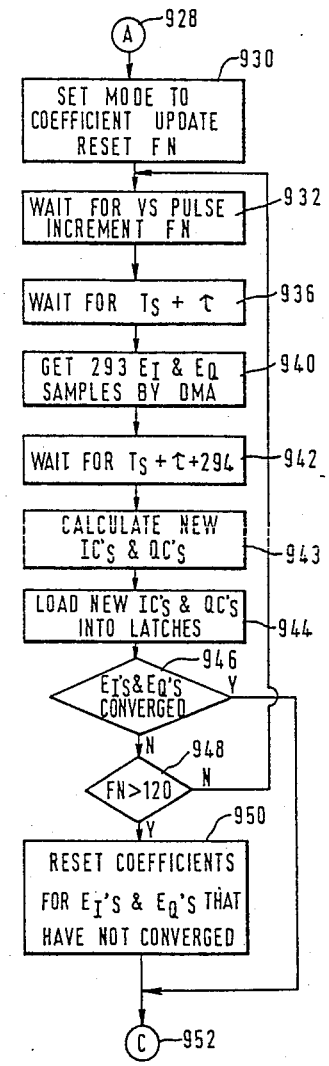

The control flow of the microprocessor in coefficient update mode is shown in FIG. 9B. The first step, 930, changes the signal, MODE, to its coefficient-update value and resets the internal field number variable FN. The microprocessor then waits for the next pulse of the signal VS and increments FN, 932. At step 936 the microprocessor waits $T_s+\tau$ sample periods after the occurrence of the VS pulse to obtain samples of the error signals $E_I$ and $E_Q$ via a direct memory access command 940. The microprocessor waits for the memory access to complete 942, and then calculates new values for the coefficients IC1 through IC5 and QC1 through QC5, using an algorithm similar to that described in equation 8. For the present embodiment, the equation 8

$$h_k(i+1) = h_k(i) + 2\mu(\hat{s}_i(n) - s_{REF})\hat{s}_i^*(n-k) \quad (8)$$

becomes $$h_k(i+1) = h_k(i) + 2\mu E_i(n) E_i^*(n-k). \quad (10)$$

In equation 10, $h_k(i+1)$ and $h_k(i)$ are complex numbers representing, respectively, the new and old coefficient values for the filter stage which has a time delay, equal to k clock periods. The complex coefficient $h_k(i)$ may be represented as $$h_k(i) = IC_K(i) + jQC_K(i). \quad (11)$$

The term $E_i(n)$ is a complex value representing the value of the error signals $E_I$ and $E_Q$ at the center of the leading edge of two vertical sync pulse of the ghost signal which is delayed by K clock periods relative to the direct signal. Since the signals $E_I$ and $E_Q$ represent the differentiated and limited signals, $R_I$ and $R_Q$ respectively, the reference value corresponding to $s_{REF}$ is zero. Finally, the term $E_i^*(n-k)$ is a complex value representing the complex conjugate of $E_i(o)$. Which is to say, the $E_I$ and twos complemented $E_Q$ values for the central sample of the leading edge of vertical sync from the direct signal. The value $2\mu$ is a scaler adaptation constant which, for example, may be equal to $2^{-13}$.

When the new coefficient values have been calculated, they are loaded into the latches of the appropriate filter stages, 944. The microprocessor then checks the error signals $E_I$ and $E_Q$ for convergence over, for example, a ten second interval. If the error signals have converged, the control flow branches to the deghosting mode, 952. If the coefficients have not converged, 948, the microprocessor branches back to the step 932 to process the vertical sync pulse of another field until 120 fields have been processed (2 seconds). If the error signals $E_I$ and $E_Q$ have not converged after 2 seconds, the microprocessor resets the coefficients IC and QC corresponding to the error signal values which have not converged 950 and branches to deghosting mode 952.

The control flow for the deghosting mode in the present embodiment is shown in FIG. 9D. This flow chart is identical to the flow chart shown in FIG. 8C with the exception of the initial setting of the signal, MODE, to its deghosting value.

Although the step 926 of FIG. 9A shows the previously calculated coefficient values for a particular channel being restored before entering coefficient update mode, it is contemplated that the viewer may override this step, causing the deghosting system to correlate and calculate new values of delay (D's) and filter coefficients (IC's and QC's). This option may be desirable when the position of the television antenna may be changed from time to time.

The embodiments of the invention described above are in terms of digital circuitry. It is contemplated, however, that the present invention may be practiced using analog sampled data circuitry such as charge coupled devices, CCD's and analog arithmetic circuits (adders, subtracters and multipliers).

What is claimed is:

1. A sampled data signal filtering and correlation system comprising:
   an input terminal for applying input signals to the system;
   a control terminal for applying a control signal to selectively condition the system to operate as a filtering system or as a correlation system;
   means coupled to said input terminal for combining said input signals with correction signals to produce first output signals;
   a finite impulse response filter having an input terminal coupled to said combining means, a plurality of terminals for applying filter coefficient values and an output terminal;
   means coupled to the output terminal of said filter and to said control terminal for alternatively applying signals provided by said filter to said combining means as said correction signals or to an output terminal as a second output signal, responsive to said control signal conditioning the system to operate as a filtering system and as a correlation system respectively; and
   means coupled to said filter for alternatively applying predetermined filter coefficient values or predetermined correlator coefficient values to the coefficient input terminals of said filter conincident with said control signal conditioning the system to operate as a filtering system and as a correlation system respectively.

2. The system set forth in claim 1, wherein said finite impulse response filter further includes a plurality of programmable delay elements each corresponding to a respectively different one of said plurality of filter coefficient values and a plurality of terminals for applying delay values to program said programmable delay elements; and
   said system further includes means coupled to said filter for alternatively applying predetermined filter delay values or predetermined correlator delay values to the delay value input terminals of said filter conincident with said control signal conditioning the system to operate as a filtering system and as a correlation system respectively.

3. A system for correcting multipath distortion comprising:
   an input terminal for applying input signals having direct signal components and delayed-direct (ghost) signal components;
   a control terminal for applying a control signal which exhibits first and second values:
   means coupled to said input terminal for combining the signals applied thereto with correction signals to develop first output signals;
   means coupled to said input terminal for developing a training signal including direct and ghost signal components;
   signal multiplexing means having a first input terminal coupled to said combining means, a second input terminal coupled to said training signal developing means and a control input terminal coupled to said control terminal, for alternatively providing signals developed by said combining means and signals developed by said training signal developing means at an output terminal in response to said control signal exhibiting said first and second values, respectively;
   a finite impulse response filter having an input terminal coupled to said multiplexing means, a plurality of coefficient input terminals for applying filter coefficient values and an output terminal;
   means coupled to the output terminal of said filter and to said control signal terminal for alternatively applying signals provided by said filter to said combining means as said correction signal and to an output terminal as a second output signal, responsive to said control signal exhibiting said first and second values, respectively; and means coupled to said filter for alternatively applying predetermined filter coefficients and predetermined correlation coefficients to the coefficient input terminals of said filter coincident with said control signal exhibiting said first and second values, respectively;

wherein said first output signal represents the direct signal to the relative exclusion of any ghost signal components when said control signal exhibits said first value and said second output signal represents a correlation of the direct and ghost signals when said control signal exhibits said second value.

4. The system set forth in claim 3 wherein said finite impulse response filter further includes a plurality of programmable delay elements each corresponding to a respectively different one of said plurality of filter coefficient values and a plurality of terminals for applying delay values to program said programmable delay elements; and further comprising means coupled to said filter for alternatively applying predetermined filter delay values or predetermined correlation delay values to the delay value input terminals of said filter coincident with said control signal exhibiting said first and second values, respectively.

5. A system for correcting multipath distortion in television signals comprising:

an input terminal for applying television signals having direct video signal components including a vertical synchronizing signal component and delayed-direct (ghost) video signal components modulating a carrier signal;

a control terminal for applying a control signal which exhibits first and second states;

demodulation means coupled to said input terminal for developing first and second signals representing baseband signals which are in-phase with and quadrature-phase related to said carrier signal;

means coupled to said demodulation means for combining said first and second base band signals with respective first and second correction signals to develop first and second corrected signals;

means coupled to said demodulation means and responsive to the vertical synchronizing signal components of said training signal developing means for providing said first and second baseband signals for developing training signals including direct and ghost signal components;

signal multiplexing means having a control input terminal coupled to said control terminal, first input terminals coupled to said combining means, and second input terminals coupled to said training signal developing means for providing said first and second corrected signals at respective first and second output terminals and for providing said training signals at a predetermined one of said first and second output terminals in response to said control signal exhibiting said first and second values, respectively;

a complex finite impulse response filter having real and imaginary input terminals coupled to the respective first and second output terminals of said signal multiplexing means, having a plurality of real and imaginary coefficient input terminals for applying complex coefficient values and having real and imaginary output terminals;

means coupled to the output terminals of said filter and responsive to said control signal, for selectively applying the signals provided at said real and imaginary output terminals, respectively, as said first and second correction signals to said combining means, and alternatively for applying the signals provided by one of said real and imaginary output terminals to a correlator output terminal in response to said control signal exhibiting said first and second values, respectively; and means coupled to said filter and to said control signal terminal for alternatively applying predetermined complex filter coefficients and predetermined correlator coefficients to the coefficients input terminals of said filter coincident with said control signal exhibiting said first and second values, respectively;

wherein said first and second corrected signals represent the direct signal components of the respective in-phase and quadrature-phase components of said television signals to the relative exclusion of any ghost signal components when said control signal exhibits said first value and the signal available at said correlator output terminal represents a correlation of said direct and ghost signal components of said training signals when said control signal exhibits said second value.

6. The system set forth in claim 5, wherein said complex finite impulse response filter further includes a plurality of programmable delay elements each corresponding to a respectively different one of said real and imaginary coefficient values and a plurality of terminals for applying delay values to program said programmable delay elements; and further comprising means coupled to said filter and to said control signal terminal for alternately applying a plurality of predetermined filter delay values and a plurality of predetermined correlator delay values to the respective delay value input terminals of said filter coincident with said control signal exhibiting said first and second values, respectively.

7. The system set forth in claim 5, wherein said training signal developing means comprises:

differentiating means coupled to said demodulating means for developing first and second differential signals representing, respectively, the differentials of portions of said first and second baseband signals including predetermined portions of said vertical synchronizing signals;

means coupled to said differentiating means for developing first and second squared signals representing, respectively, the squares of said first and second differential signals; and means coupled to asid squared signal developing means for combining said first and second squared signals to develop said training signals.

8. The system set forth in claim 7, further comprising: means for developing said correlator coefficients including, means, coupled to said demodulation means, for developing third and fourth differential signals representing, respectively, the differentials of portions of said first and second baseband signals including predetermined portions of said vertical synchronizing signals, for developing third and fourth squared signals representing, respectively, the squares of said third and fourth differential signals, for combining said third and fourth differential signals to develop a fifth signal, for normalizing said fifth signal relative to a predetermined value, and for extracting samples of asid fifth signal at predetermined intervals as said correlator coefficients.

* * * * *

UNITED STATES PATENT AND TRADEMARK OFFICE
CERTIFICATE OF CORRECTION

PATENT NO. : 4,698,680    Page 1 of 2
DATED : October 6, 1987
INVENTOR(S) : Henry G. Lewis, Jr. et al.

It is certified that error appears in the above-identified patent and that said Letters Patent is hereby corrected as shown below:    Title page:

ON THE ABSTRACT SHEET:

[56] References Cited - under OTHER PUBLICATIONS -

"Orfanidis, S. I." should read -- Orfanidis, S. J. -- .

IN THE SPECIFICATION:

Column 4, Line 11 - "(0.46H)" should read -- (.46H) -- ;

Column 7, Line 10 - "the equalization" should read -- the sixth equalization -- ;

Column 7, Line 37 - after "420" insert a comma -- , -- ;

Column 9, Line 9 - "$\hat{S}_I(n)$ and $\hat{S}_Q(n)$" should read -- $\hat{s}_I(n)$ and $\hat{s}_Q(n)$ -- ;

Column 9, Line 42 - "$2^{31\ 13}$" should read -- $2^{-13}$ -- ;

Column 9, Line 43 - "2 µof" should read -- 2µ of -- ;

Column 14, Line 59 - "values m," should read -- values, m, -- ; and

Column 16, Line 25 - "values m," should read -- values, m, -- .

UNITED STATES PATENT AND TRADEMARK OFFICE
CERTIFICATE OF CORRECTION

PATENT NO. : 4,698,680

DATED : October 6, 1987

INVENTOR(S) : Henry G. Lewis, Jr. et al.

It is certified that error appears in the above-identified patent and that said Letters Patent is hereby corrected as shown below:

IN THE CLAIMS:

Column 19, Lines 43-44  -  delete "training signal developing means for providing said" ;

Column 20, Line 49  -  "asid" should read -- said -- ; and

Column 20, Line 65  -  "asid" should read -- said -- .

Signed and Sealed this

Twentieth Day of December, 1988

*Attest:*

DONALD J. QUIGG

*Attesting Officer*  *Commissioner of Patents and Trademarks*